(12) United States Patent
Hummel

(10) Patent No.: US 7,582,998 B2
(45) Date of Patent: Sep. 1, 2009

(54) BRUSHLESS DC ELECTRICAL GENERATOR

(76) Inventor: Stephen Hummel, 2308 - 16$^{th}$ Ave. Southwest, Austin, MN (US) 55912

( * ) Notice: Subject to any disclaimer, the term of this patent is extended or adjusted under 35 U.S.C. 154(b) by 0 days.

(21) Appl. No.: 11/782,161

(22) Filed: Jul. 24, 2007

(65) Prior Publication Data

US 2009/0026862 A1     Jan. 29, 2009

(51) Int. Cl.
*H02K 23/00* (2006.01)
(52) U.S. Cl. ....................................................... 310/177
(58) Field of Classification Search ................. 310/177, 310/178, 268, 216, 179; 360/99.04; 322/48
See application file for complete search history.

(56) References Cited

U.S. PATENT DOCUMENTS

| | | | |
|---|---|---|---|
| 2,051,249 A * | 8/1936 | Edwards | .......................... 173/5 |
| 3,247,407 A * | 4/1966 | Bruneel | ........................ 310/155 |
| 3,320,454 A | 5/1967 | Kober | |
| 3,428,840 A | 2/1969 | Kober | |
| 3,869,626 A | 3/1975 | Puttock et al. | |
| 4,451,749 A | 5/1984 | Kanayama et al. | |
| 4,477,745 A | 10/1984 | Lux | |
| 5,278,624 A * | 1/1994 | Kamprath et al. | ............ 399/395 |
| 5,334,899 A * | 8/1994 | Skybyk | ....................... 310/268 |
| 5,977,684 A * | 11/1999 | Lin | ............................. 310/268 |
| 2006/0181170 A1* | 8/2006 | Fiset | ........................... 310/113 |
| 2007/0024144 A1* | 2/2007 | Obidniak | ............... 310/156.36 |

* cited by examiner

*Primary Examiner*—Chandrika Prasad
(74) *Attorney, Agent, or Firm*—Dorsey & Whitney LLP; Nathan J. Witzany

(57) ABSTRACT

The present invention is a direct current generating machine that eliminates the need for brushes or other mechanical commutators. A pair of opposed, spaced apart rotatable rotors, each carrying a plurality of bar magnets, are synchronously rotated about a common axis of rotation. A stationary electrically conducting wire extends through the axis of rotation, and radially outwardly therefrom, between the rotating magnetic field. In another embodiment the bar magnets are replaced by pieces of steel which interrupt a unidirectional, magnetic field created by a magnet. The magnet used to create the unidirectional, magnetic field may be an electromagnet. The resultant electrical signal generated in the conductor is unidirectional. The present invention may be used to create brushless DC electrical signals, brushless three-phase DC electrical signals, or a plurality of DC and/or inverted DC signals.

20 Claims, 3 Drawing Sheets

BRUSHLESS DC ELECTRICAL GENERATOR

FIELD OF THE INVENTION

This present disclosure relates to apparatus and methods for energy conversion devices. More particularly, the present disclosure relates to apparatus and methods for energy conversion devices for generating direct current ("DC") electrical signals from a mechanical energy input, without the use of brushes or other mechanical commutators.

BACKGROUND OF THE INVENTION

Current technologies for generating DC electrical signals from mechanical, rotating machines are well-known. These devices typically include an armature winding, rotatable within a stationary magnetic field. Unfortunately, the need for a mechanical rectifier, in the form of a commutator, to convert the alternating current ("AC") electromagnetic field that is induced in each armature coil to a unidirectional voltage places such machines among the least rugged, and more expensive, classes of electric machines.

Thus, there is a need in the art for energy conversion devices without the complications presented by the prior art. There is a need in the art for an improved energy conversion device that generates DC electrical signals from a mechanical energy input, without the use of brushes or other mechanical commutators.

BRIEF SUMMARY OF THE INVENTION

The present invention, in one embodiment, is a generator for generating a unidirectional electrical signal. The generator includes means for providing a magnetic field, wherein the magnetic field is generally uniformly, circumferentially distributed about a center axis. The generator further includes means for rotating the magnetic field about the center axis. Stationary electrical conducting means extend from the center axis and through the magnetic field, whereby the magnetic field cuts across the electrical conducting means in a uniform direction when the magnetic field is rotated, inducing a unidirectional electric signal in the conductor.

The present invention, in another embodiment, is a generator for generating a unidirectional electrical signal including means for providing a magnetic field, a rotor comprising at least one magnetic field interrupting structure, the rotor adapted for rotating the at least one magnetic field interrupting structure about a center axis of the rotor and through the magnetic field. Stationary electrical conducting means extend from the center axis and through the magnetic field, whereby the at least one magnetic field interrupting structure cuts across the electrical conducting means in a uniform direction when the rotor is rotated, thereby inducing a unidirectional electric signal in the conductor.

The present invention in yet another embodiment is a method for creating a brushless direct current electrical signal. The method comprises rotating a rotor comprising at least one structure having high magnetic permeability about a central axis and through a unidirectional magnetic field. Each structure having high magnetic permeability is generally aligned at a common radius about the central axis. A stationary electrical conductor extends from the central axis and through the magnetic field, whereby the structures having high magnetic permeability cut across the electrical conductor in a uniform direction when rotated through the magnetic field, thereby inducing a unidirectional electric signal in the conductor.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

The present disclosure relates to a novel and advantageous brushless DC electrical generator. The problems of DC generating machines outlined above are in large part solved by a DC electrical generator in accordance with the present disclosure. The need for a mechanical rectifier may be eliminated by fixedly positioning a stationary conductor within a mechanically rotated magnetic field. More particularly, a pair of opposed, rotatable rotors, each carrying a plurality of bar magnets, may be mechanically rotated about an axis of rotation. Alternatively, a stationary conductor may be positioned within a magnetic field that is interrupted by rotatable rotors, each carrying a plurality of pieces of steel, or the like. An electrically conducting wire may extend through the axis of rotation and radially outwardly therefrom between the rotating rotors. A DC electrical signal may be thereby generated in the conductor, without the need for a mechanical commutator.

Figure 1:
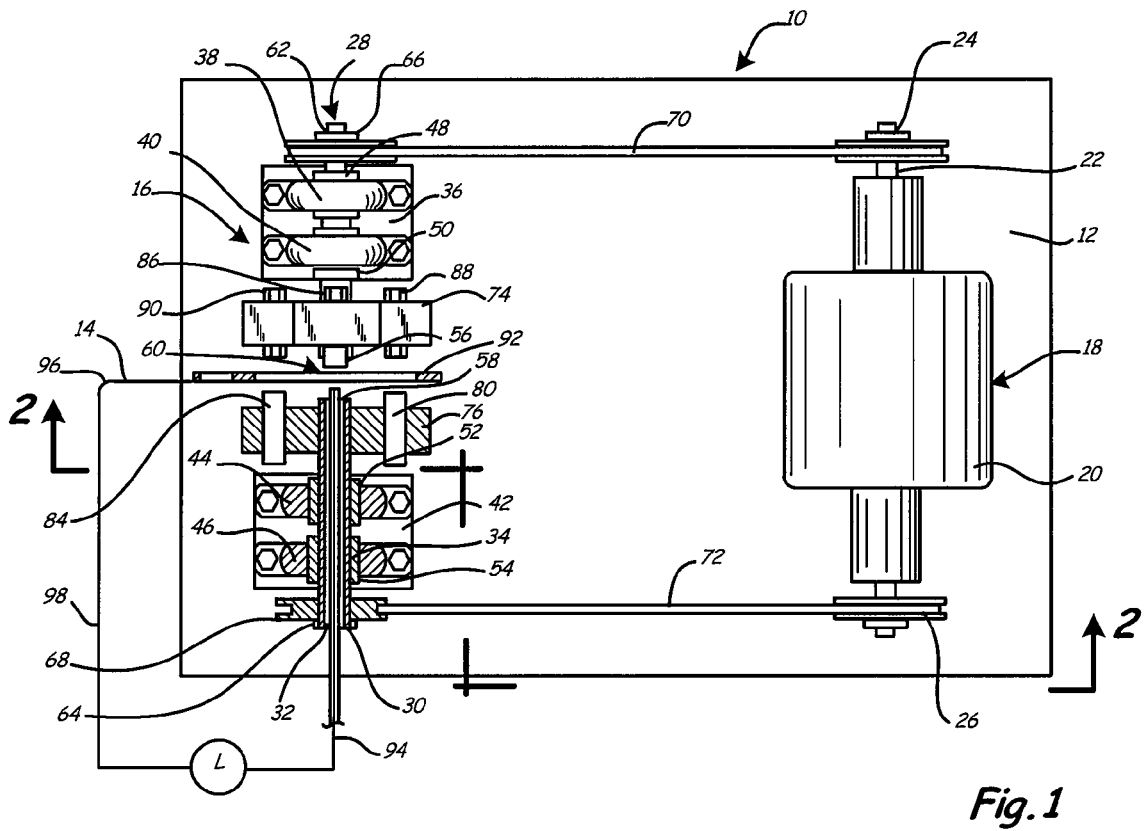
FIG. 1 is a top plan view of an electrical generator in accordance with one embodiment of the present disclosure, with parts cut away for clarity.
Figure 2:
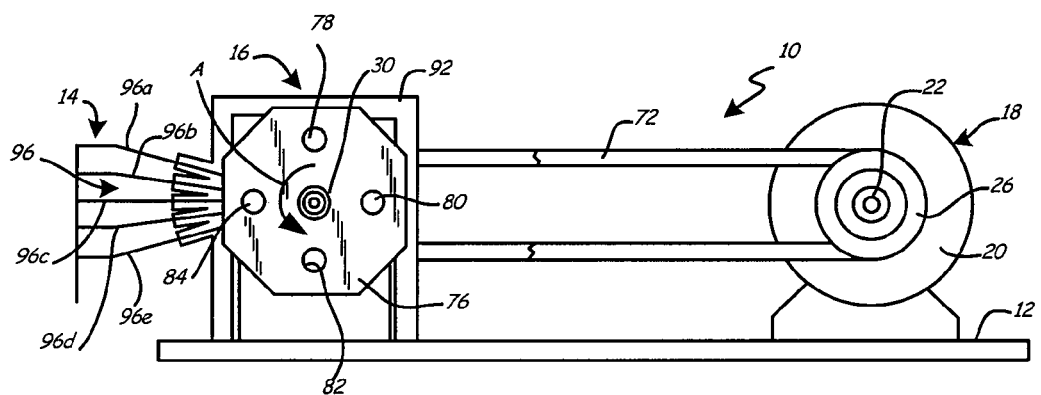
FIG. 2 is a sectional elevation view of the electrical generator of FIG. 1, taken along the line 2-2 of FIG. 1.

With reference to FIGS. 1 and 2, an electrical generator 10 in accordance with the present disclosure may be mounted on a base plate 12. The generator 10 may broadly include a stationary, signal presenting, electrical conductor 14, a rotating assembly 16, and an external energy source 18.

In one embodiment, the external energy source 18 may be an electric motor 20, as illustrated in FIGS. 1 and 2. In alternative embodiments, the external energy source 18 may be any other suitable rotating energy source, such as but not limited to, a manual crank, a water powered rotating shaft, a wind powered rotating shaft, or any combination thereof. The motor 20 may include a common center shaft 22, rotatably supporting opposed pulleys 24, 26.

The rotating assembly 16 may include first and second, opposed, axially aligned, rotatable shafts 28, 30. One or each of the shafts 28, 30 may be tubular, including inner and outer cylindrical surfaces 32, 34. The shaft 28 may be mounted on the base plate 12 by a bearing mount 36, and may be rotatably supported on the bearing mount 36 by one or more pillow blocks, e.g., 38, 40. The shaft 30 may be mounted on the base plate 12 by a bearing mount 42, and may be rotatably supported on the bearing mount 42 by one or more pillow blocks, e.g., 44, 46. Each of the pillow blocks 38, 40, 44, 46 may include a sleeve bearing 48, 50, 52, 54, respectively, for rotatably supporting respective shafts 28, 30. The shafts 28, 30 may be any suitable size, typically depending on the application of the electrical generator 10. The shafts 28, 30 may generally be long, such as one foot in length or longer, or short, such as less than one foot in length. The shafts 28, 30 may have any size diameter to accommodate the conductor, including any size inner cylindrical diameter with any suitable size outer cylindrical diameter.

The mutually facing ends 56, 58 of the axially aligned shafts 28, 30 may be spaced apart to present a gap 60 therebetween. The opposite ends 62, 64 of the shafts 28, 30 each may respectively carry a rotatable pulley 66, 68.

The pulley 66 mounted on the shaft 28 of the rotatable assembly 16, and the pulley 24 mounted on the shaft 22 of the motor 20 may be drivingly connected by a belt 70, chain, linking mechanism, or any other suitable system for connecting pulley 66 and pulley 24, such that rotation of pulley 24 causes rotation of pulley 66. The pulley 68 mounted on the shaft 30 of the rotatable assembly 16, and the pulley 26 mounted on the shaft 22 of the motor 20 may be drivingly connected by a belt 72, chain, linking mechanism, or any other suitable system for connecting pulley 68 and pulley 26, such that rotation of pulley 26 causes rotation of pulley 68. The pulley 66 may be of the same operating diameter as the pulley 68. The pulley 24 may be of the same operating diameter as the pulley 26. The belts 70 and 72 may be of the same circumference. It is to be understood, therefore, that rotation of the shaft 22 may result in mutual, synchronous rotation of the shafts 28, 30, notwithstanding their unconnected, spaced apart orientation.

A rotor 74 may be fixably carried at or near the end 56 of the shaft 28, and a rotor 76 may be fixably carried at or near the end 58 of the shaft 30, such that the rotors 74, 76 are carried in opposed, generally mutually parallel orientation across the gap 60. The rotor 76 may support one or more circumferentially spaced apart bar magnets. In one embodiment, the rotor 76 may include four, equiangularly, circumferentially spaced apart bar magnets 78, 80, 82, 84. That is, each of the magnets may be carried by the rotor 76 at a common radius from the axis of rotation defined by the shafts 28, 30. In other embodiments, the rotor 76 may include a greater or lesser number of circumferentially spaced apart bar magnets, which may further be spaced apart equiangularly. The magnetic fields of each of the magnets, e.g., 78, 80, 82, 84, may be aligned and parallel, and oriented in the same direction. In a further embodiment, the rotor 76 may be nonmagnetic. Similarly, any means for attaching the magnets, e.g., 78, 80, 82, 84, to the rotor may be nonmagnetic.

The rotor 74 may also support one or more circumferentially spaced apart bar magnets. In one embodiment, the rotor 74 may include four equiangularly, circumferentially spaced apart bar magnets 86, 88, 90 (fourth not shown), that are carried at the same common radius from the axis of rotation defined by the shafts 28, 30 as the radius that the bar magnets 78, 80, 82, 84 are carried by the rotor 76. In other embodiments, the rotor 74 may include a greater or lesser number of circumferentially spaced apart bar magnets, which may further be spaced apart equiangularly. Typically, rotor 74 and rotor 76 may carry the same number of magnets. Moreover, the magnetic field of each of the bar magnets carried by rotor 74 may be aligned with the magnetic field of a respective bar magnet carried by rotor 76, and may be orientated in the same direction to provide a plurality of individually aligned, north/south magnetic field pairs, that collectively define a generally uniform, circumferentially distributed magnetic field. In a further embodiment, the rotor 74 may be nonmagnetic. Similarly, any means for attaching the magnets, e.g., 86, 88, 90, to the rotor may be nonmagnetic. As will be described in further detail below, in some embodiments, such as an embodiment having an electromagnet creating a unidirectional magnetic field, the magnets, e.g., 78, 80, 82, 84, 86, 88, 90, may be replaced by pieces of steel or other suitable material having high magnetic permeability to interrupt the magnetic field.

In alternative embodiments, a single rotor may be used in lieu of two rotors. Generally, the number of rotors used may depend on the application the electrical generator 10 is used for and/or the size, shape, and power requirements for the application.

The electric generator may include means for fixably positioning a portion of an electrical conductor between the rotors 76, 78. In one embodiment, a frame 92 may be fixedly positioned within the gap 60, between the rotors 76, 78. The frame 92 may be nonmagnetic. In an alternative embodiment, the frame 92 need not be positioned within the gap 60 and may be positioned at any suitable location, such that the frame 92 supports the electrical conductor so that a portion of the electrical conductor passes between the rotors 76, 78. In other embodiments, a frame 92 may be unnecessary, and a portion of the electrical conductor may be held fixedly positioned within the gap 60 by other suitable means, such as hangers, by tension, etc.

Figure 3:
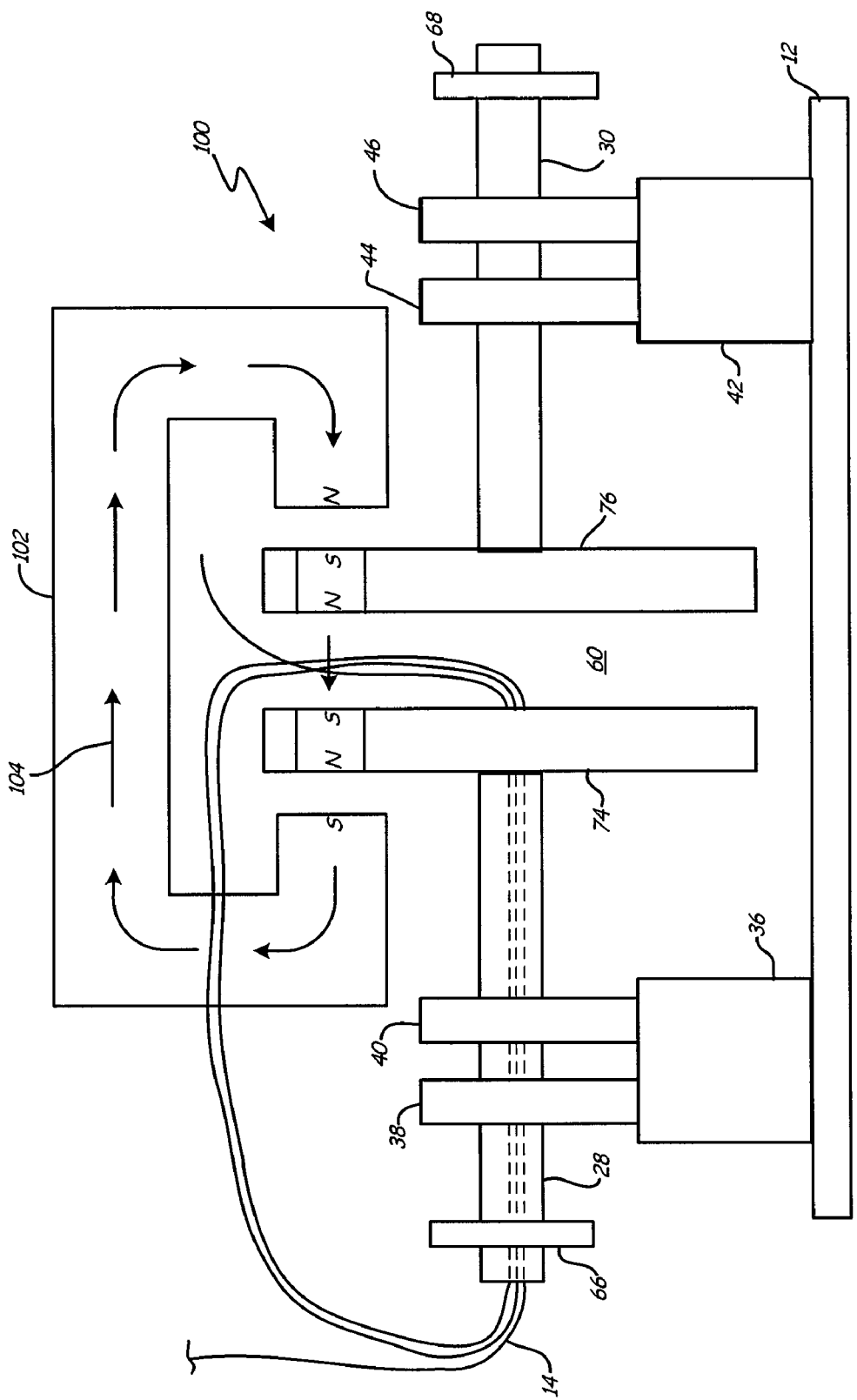
FIG. 3 is a front view of a rotating assembly of an electrical generator in accordance with another embodiment of the present disclosure.
Figure 4:
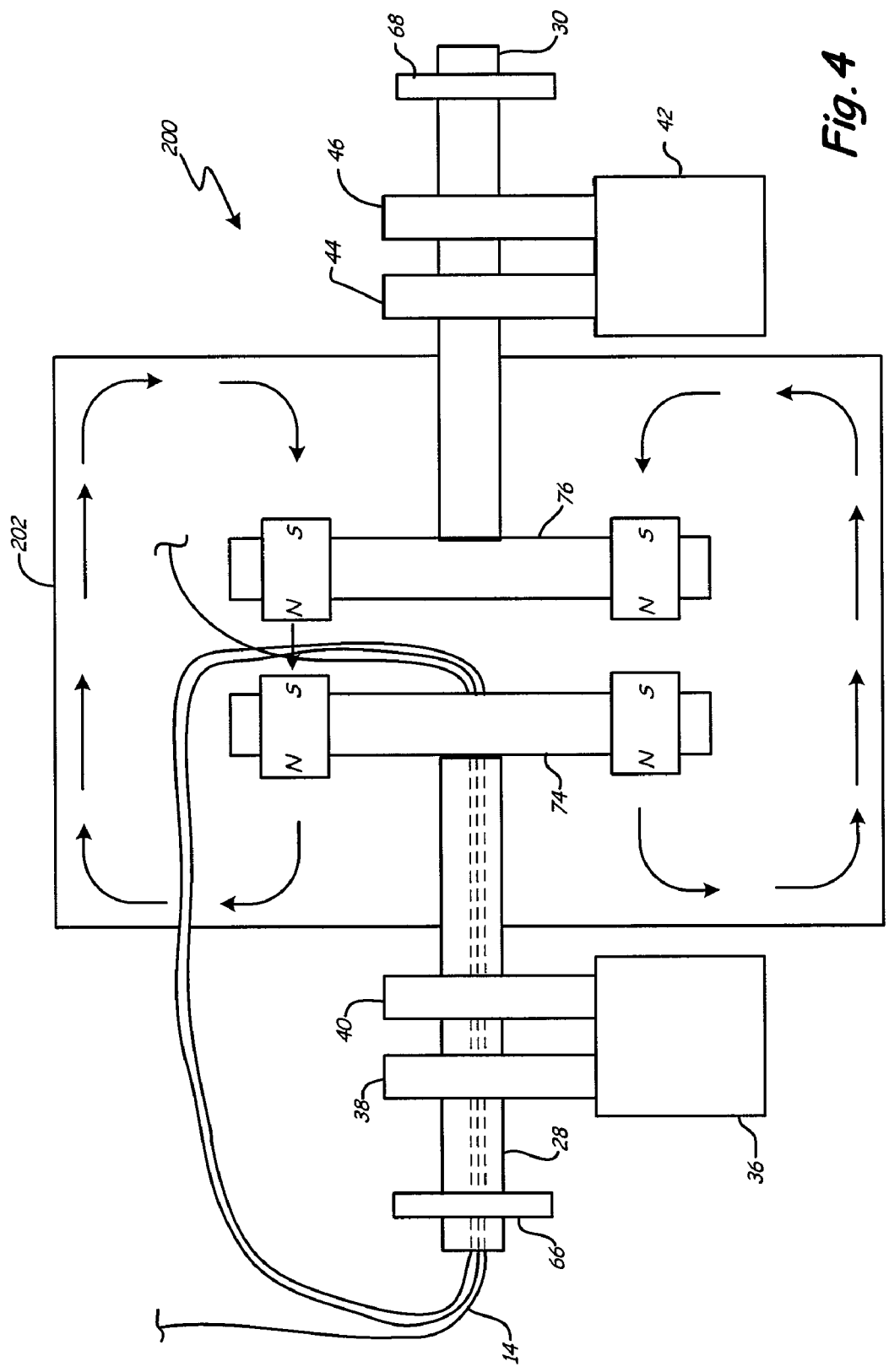
FIG. 4 is a front view of a rotating assembly of an electrical generator in accordance with yet another embodiment of the present disclosure.

In one embodiment, one or more electrical conductors 14 may be included in the electrical generator 10. An electrical conductor 14 may include an axial portion 94 received through the tubular shaft 30 and along the axis of rotation defined by the shafts 28, 30. A conductor 14 may also include an integral, radially extending portion 96, supported by the frame 92, and extending radially outwardly through the gap 60 from the axis of rotation defined by the shafts 28, 30, to a point extending beyond the radius defined by the aforementioned bar magnets. A conductor 14 may also include an external portion 98. The portions 94, 96, 98 of a conductor 14 may be electrically connected to each other, and to electrical load L. As illustrated in FIGS. 1 and 2, the conductors 14 may be in an array. That is, it will be seen that the electrical conductor 14 may include a plurality of individual radial portions 96a, 96b, 96c, 96d, 96e to provide a plurality of radially extending conductor portions within the gap 60. In other embodiments, such as shown in FIGS. 3 and 4, a conductor 14 may be a coil or coils, in series or in parallel, as is understood in the art. In this manner, wherein a portion of the conductor is received through the tubular shaft 30, the conductor 14 may always be cut in the same direction, and brushless DC electrical signals may be created.

In a further embodiment, one or more electrical conductors 14 may be included with respect to tubular shaft 28 in a similar manner as that of shaft 30. That is, an electrical conductor 14 may include an axial portion received through the tubular shaft 28 and along the axis of rotation defined by the shafts 28, 30. A conductor 14 may also include an integral, radially extending portion, supported by the frame 92, and extending radially outwardly through the gap 60 from the axis of rotation defined by the shafts 28, 30, to a point extending beyond the radius defined by the aforementioned bar magnets. A conductor 14 may also include an external portion. The portions of a conductor 14 described above may be electrically connected to each other, and to electrical load L or a different electrical load. As illustrated in FIGS. 1 and 2, the conductors 14 may be in an array. That is, it will be seen that the electrical conductor 14 may include a plurality of individual radial portions to provide a plurality of radially extending conductor portions within the gap 60. In other embodiments, such as shown in FIGS. 3 and 4, a conductor 14 may be a coil or coils, in series or in parallel, as is understood in the art.

In operation, the shaft 22 of the external energy source 18 may be rotated, thereby causing the pulleys 24, 26 to rotate in unison. As described above, the belts 70, 72 may be of the same circumference, and the pulleys 66 and 68 may be of the same operating diameter. The shafts 28, 30 may therefore be rotated synchronously by the rotation of the shaft 22. Respective opposed pairs of bar magnets carried by the rotors 74, 76 present a collective magnetic field across the gap 60. Synchronous rotation of the shafts 28, 30 may cause the magnetic field presented across the gap 60 to rotate, while the radial portion 96 of the electrical conductor 14 is held stationary within the gap 60. The magnetic conductor 14 may pass through the axis of rotation defined by the shafts 28, 30 and extend radially outwardly therefrom. The rotating magnetic field may continuously cut across, or pass across, the radial portion 96 of the conductor 14 in a uniform direction, such as the uniform direction illustrated by arrow A in FIG. 2. A direct current electrical signal may be thereby created in the conductor 14 and presented to the load L.

In another embodiment, as illustrated in FIG. 3, an electrical generator 100 in accordance with the present disclosure may further include a magnet 102, illustrated as a horseshoe magnet, which may be used to create a magnetic field 104 passing through rotors 74, 76. The magnet 102 may be used to create a magnetic field/circuit that is unidirectional. Although illustrated as a horseshoe magnet in FIG. 3, it is recognized that any suitable magnet or combination of magnets may be used to create the unidirectional, magnetic field.

In an alternative embodiment, the magnet 102 may be an electromagnet, wherein the magnetic field is produced by the flow of electric current, as is understood in the art. In a further embodiment, the magnets on the rotors, e.g., 78, 80, 82, 84, 86, 88, 90, may be eliminated and replaced by pieces of material having high magnetic permeability, such as but not limited to, steel.

In some embodiments, the poles of the magnet 102 may be reversed, resulting in an inverted DC electrical signal in the conductor 14. In other embodiments, more than one magnet 102 and a corresponding conductor 14 may be provided to create more than one DC electrical signal. For example, three magnets 102 and corresponding conductors 14 may be used to create three-phase electric power that is brushless DC. In yet further embodiments, any assortment of suitable energy outputs may be produced for different applications. That is, any suitable number of magnets 102 and/or conductors 14 may be provided to produce a desired energy output, including a combination of normal and inverted DC electrical signals.

In another embodiment, illustrated in FIG. 4, an electrical generator 200 in accordance with the present disclosure may include a generator case 202 generally surrounding the rotors 74, 76. The generator case 202 may be manufactured from magnetic material. As such, the generator case 202 may be used to create the unidirectional, magnetic field described above in relation to the magnet 102. Such a generator case 202 may be used in lieu of, or in some cases, in addition to, the magnet 102. The generator case 202 may be sized and shaped to adapt for any suitable application of the electrical generator 200.

Although the present invention has been described with reference to preferred embodiments, persons skilled in the art will recognize that changes may be made in form and detail without departing from the spirit and scope of the invention. For example, it is recognized that an electrical generator of the present disclosure can and may be adapted, configured, or designed for any type of suitable application. For example, as previously described, an electrical generator may have more than one magnet or electromagnet, oriented in like manner or not, a case may be used instead of an electromagnet, a single rotor may be used, a conductor coil, conductor coil(s), in series or parallel, or conductor array may be used, etc. In addition, the dimensions, shape, and configuration may all be adapted for any suitable application and power requirements.

I claim:

1. An apparatus for the generation of a unidirectional electrical signal, comprising:

first and second, opposed, spaced apart, generally parallel, rotor discs oriented generally perpendicular to a center axis of the rotor discs, and mutually defining a gap therebetween, the first rotor disc carrying a first plurality of equiangularly, circumferentially spaced apart bar magnets, and the second rotor disc carrying a second plurality of equiangularly, circumferentially spaced apart bar magnets, respective ones of the second plurality of bar magnets being magnetically aligned with respective ones of the first plurality of bar magnets to provide a generally uniform magnetic field extending across the gap from the first rotor disc to the second rotor disc and circumferentially distributed about the center axis;

means for rotating the magnetic field about the center axis; and stationary electrical conducting means extending through the center axis of one of the first or second rotor discs and exiting through the circumferentially distributed magnetic field and between the first and second rotor discs, whereby the magnetic field cuts across the electrical conducting means in a uniform direction when the magnetic field is rotated about the center axis, thereby inducing a unidirectional electric signal in the conducting means.

2. The apparatus of claim 1, wherein the respective ones of the bar magnets are each oriented at a common radius from the center axis.

3. The apparatus of claim 2, wherein the first and second rotor discs are respectively coupled to respective first and second, axially aligned, spaced apart rotor shafts, and the means for rotating said magnetic field comprises means for synchronously rotating the first and second shafts.

4. The apparatus of claim 3, wherein the first and second rotor shafts each have mutually facing proximal ends spaced apart from each other across the gap, and opposed distal ends, the means for synchronously rotating the first and second shafts includes a first pulley means coupled to the first shaft for rotation therewith and a second pulley means coupled to the second shaft for rotation therewith, a master rotatable shaft oriented generally parallel to and spaced from the axis of rotation, the master shaft having first and second opposed ends, first conveyor means drivingly coupling the first master shaft end and the first pulley means, and second conveyor means drivingly coupling the second master shaft end and the second pulley means, and means for rotating the master shaft.

5. The apparatus of claim 3, wherein the first shaft includes structure defining an axially oriented, centered, internal channel, the conducting means being carried by the channel for presentation to the gap along said axis of rotation, the conducting means extending radially outwardly from the center axis beyond the common radius.

6. An apparatus for the generation of a unidirectional electrical signal, comprising:
- a rotor having a center axis and comprising at least one magnetic field interrupting structure radially from the center axis, the rotor adapted for rotating the at least one magnetic field interrupting structure about the center axis;
- means for providing a unidirectional magnetic field across a gap;
- means for rotating the rotor such that the at least one magnetic field interrupting structure passes through the gap, and thus the unidirectional magnetic field; and
- stationary electrical conducting means extending through the center axis of the rotor and exiting through the unidirectional magnetic field whereby the at least one magnetic field interrupting structure cuts across the electrical conducting means in a uniform direction when the rotor is rotated, thereby inducing a unidirectional electric signal in the conducting means.

7. The apparatus of claim 3 further comprising a plurality of electrical conducting means extending through the center axis of one of the first or second rotor discs and exiting through the circumferentially distributed magnetic field and between the first and second rotor discs, whereby the magnetic field cuts across the plurality of electrical conducting means in a uniform direction when the magnetic field is rotated about the center axis, thereby inducing a unidirectional electric signal in each of the plurality of conducting means.

8. The apparatus of claim 6, wherein the means for providing a magnetic field comprises an electromagnet.

9. The apparatus of claim 8, further comprising a second rotor having a center axis, the second rotor adapted for rotating about the center axis of the second rotor, each of the rotors comprising two or more equiangularly, circumferentially spaced apart magnetic field interrupting structures positioned radially from the respective center axis.

10. The apparatus of claim 9, wherein the magnetic field interrupting structures comprise pieces of steel.

11. A method for creating a brushless direct current electrical signal, comprising:
- rotating a first rotor comprising at least one structure having high magnetic permeability about a central axis, such that the at least one structure having high magnetic permeability is rotated through a gap having a unidirectional magnetic field spanning across the distance of the gap, wherein each of the at least one structures having high magnetic permeability are generally aligned at a common radius about the central axis, and wherein the at least one structure having high magnetic permeability cuts across a stationary electrical conductor extending through the central axis of the first rotor and exiting through the unidirectional magnetic field in a uniform direction when rotated through the magnetic field, thereby inducing a unidirectional electric signal in the conductor.

12. The method of claim 11, further comprising rotating a second rotor comprising at least one structure having high magnetic permeability about the central axis, such that the at least one structure having high magnetic permeability is rotated through the gap, wherein each of the at least one structures having high magnetic permeability of the second rotor are generally aligned with the respective structures having high magnetic permeability of the first rotor, the first and second rotors defining a gap therebetween.

13. The method of claim 12, wherein the electrical conductor extends through the magnetic field between the at least one structure having high magnetic permeability of the first rotor and the at least one structure having high magnetic permeability of the second rotor when the structures having high magnetic permeability pass through the gap.

14. The method of claim 11, wherein the unidirectional magnetic field is created by an electromagnet.

15. The method of claim 14, wherein the structures having high magnetic permeability comprise steel.

16. The method of claim 15, wherein rotating a first rotor comprising at least one structure having high magnetic permeability about a central axis and through the gap having a unidirectional magnetic field comprises rotating a first rotor comprising at least four structures having high magnetic permeability about a central axis and through the gap.

17. The method of claim 16, wherein the at least four structures having high magnetic permeability are generally positioned on the first rotor equiangularly and circumferentially spaced apart from one another about the central axis.

18. The method of claim 17, further comprising rotating a second rotor comprising at least four structures having high magnetic permeability about the central axis and through the gap having a unidirectional magnetic field, wherein the at least four structures having high magnetic permeability are generally positioned on the second rotor equiangularly and circumferentially spaced apart from one another about the central axis and are generally aligned with the respective structures having high magnetic permeability of the first rotor, the first and second rotors defining a gap therebetween.

19. The method of claim 11, further comprising providing three gaps having a unidirectional magnetic field spanning across the distance of the gap and a respective stationary electrical conductor extending through the central axis of the first rotor and exiting through its respective unidirectional magnetic field and rotating the first rotor, such that the at least one structure having high magnetic permeability is rotated through each gap.

20. The method of claim 18, further comprising providing three-phase brushless direct current electric power from the respective stationary electrical conductors of the three gaps.

* * * * *